United States Patent [19]

McCullen

[11] Patent Number: 4,835,336
[45] Date of Patent: May 30, 1989

[54] METHOD FOR SUPPRESSING HYDROGENOLYSIS OF NOBLE METAL/LOW ACIDITY ZEOLITES

[75] Inventor: Sharon B. McCullen, Newtown, Pa.

[73] Assignee: Mobil Oil Corporation, New York, N.Y.

[21] Appl. No.: 140,276

[22] Filed: Dec. 31, 1987

[51] Int. Cl.[4] .................. C07C 2/52; C10G 35/06
[52] U.S. Cl. .................. 585/419; 208/138; 208/139
[58] Field of Search ............. 208/138, 139; 585/419

[56] References Cited

U.S. PATENT DOCUMENTS

| | | | |
|---|---|---|---|
| 3,760,024 | 9/1973 | Cattanach | 208/120 |
| 3,843,741 | 10/1974 | Yan | 208/137 |
| 4,295,958 | 10/1981 | Mauldin et al. | 208/138 |
| 4,348,271 | 9/1982 | Swan | 208/138 |
| 4,350,835 | 9/1982 | Chester et al. | 585/415 |
| 4,579,831 | 4/1986 | Field | 502/66 |

OTHER PUBLICATIONS

P. Gallezot et al., "Unusual Catalytic Behavior of very Small Platinum Particles Engaged in Y Zeolites".
T. M. Tri et al., "Sulfur Resistance of Modified Platinum Y Zeolite".
P. G. Menon et al., "Effect of Sulfur Poisoning on the Hydrogenolysis Activity of Pt in Pt/Al$_2$O$_3$ Catalysts".
C. R. Apesteguia et al., "The Role of Catalyst Presulfurization in Some Reactions . . . ".
V. Ponec "Selectivity in Catalysis by Alloys".
F. M. Dautzenberg et al. "Conversion of n-Hexane over Monofunctional . . .".
Rabo et al., "Sulfur-Resistant Isomerization Catalyst: Study of Atomic . . . ".
P. Biloen et al., "The Role of Rhenium and Sulfur in Platinum-Based Hydrocarbon-Conversion Catalysts".
J. R. H. van Schaik et al., "Reactions of Alkanes on Supported Pt—Au Alloys".

Primary Examiner—Curtis R. Davis
Attorney, Agent, or Firm—Alexander J. McKillop; Charles J. Speciale; Robert B. Furr, Jr.

[57] ABSTRACT

A process for converting a C$_6$–C$_{12}$ paraffinic hydrocarbon feed to aromatics by contacting the feed with a noble metal/low acidity medium pore size zeolite catalyst in a conversion zone by modifying the noble metal component of the catalyst to its sulfide form by either presulfiding the catalyst or adding at least one of H$_2$S, SO$_2$ or an organic sulfur compound to the feed in an amount effective to suppress hydrogenolysis and increase aromatic selectivity of the catalyst.

21 Claims, 1 Drawing Sheet

METHOD FOR SUPPRESSING HYDROGENOLYSIS OF NOBLE METAL/LOW ACIDITY ZEOLITES

FIELD OF THE INVENTION

The present invention relates to the production of aromatics. More particularly, the present invention relates to a process for converting nonaromatic $C_6+$ hydrocarbons to aromatics. Even more particularly, the present invention relates to a process for the manufacture of gasoline boiling range hydrocarbons using a noble metal/low acidity zeolite catalyst, by suppressing hydrogenolysis and increasing the aromatic selectivity of the catalyst.

BACKGROUND OF THE INVENTION

Methods for producing gasoline boiling range aromatic hydrocarbons from nonaromatic hydrocarbon feeds by employing a medium pore size zeolite type catalyst are generally known as exemplified in. e.g., U.S. Pat. Nos. 3,760,024, 3,843,741 and 4,350,835. In such processes, the desired end product comprises primarily gasoline boiling range materials. Gasoline, as such term is used herein, and as such term is commonly used in the petroleum industry, is useful as a motor fuel for internal combustion engines. More specifically, gasoline is hydrocarbon in nature, and contains various aliphatic and aromatic hydrocarbons having a full boiling range of about 280° to 430° F., depending on the exact blend used and the time of year. Although gasoline is predominantly hydrocarbon in nature, various additives which are not necessarily exclusively hydrocarbon are often included. Additives of this type are usually present in very small proportions. e.g., less than 1% by volume of the total gasoline. Further, it is also not uncommon for various gasolines to be formulated with non-hydrocarbon components, particularly alcohols and/or ethers as significant, although not major, constituents thereof. Such alcohols, ethers and the like have burning qualities in internal combustion engines which are similar to those of hydrocarbons in the gasoline boiling range. For purposes of this specification and the present invention however, the term "gasoline" denotes a mixture of hydrocarbons boiling in the aforementioned gasoline boiling range and is not intended to include the above-referred to additives and/or non-hydrocarbon constituents.

High octane gasoline is desirable for use with internal combustion engines from a standpoint of fuel efficiency, and thus also is attractive from an economic perspective. Further, the gradual phasing out of lead in gasoline has created a demand for new methods for obtaining high octane gasoline. It is known that aromatic gasoline boiling range hydrocarbons have high octane (R+O). (M+O) and/or (R+M)/2 values. It is known that gasoline octane is related to the aromatic selectivity of the catalyst. An increase in aromatic selectivity will result in increased gasoline octane values. Aromatic selectivity, as used throughout the specification, is defined as (wt % aromatics produced/$C_5+$)$\times$100. Hence methods which are capable of increasing the aromatic selectivity of the catalyst are very desirable.

Hydrogenolysis is an unwanted side reaction which occurs during the production of gasoline and which reduces the aromatic selectivity of the catalyst. A survey of the literature shows that noble metal/$SiO_2$ or $Al_2O_3$ catalysts, when modified with sulfur, silver, tin, and copper are known to have different hydrogenolysis activity than unmodified noble metal/$SiO_2$ or $Al_2O_3$ catalysts. See, e.g., P. G. Menon et al., "Effect of Sulfur Poisoning on the Hydrogenolysis Activity of Pt in Pt/$Al_2O_3$ Catalysts". *Ind. Eng. Chem. Prod. Res. Dev.*, 21, 52 (1982) C. R. Apesteguia et al. "The Role of Catalyst Presulfurization in Some Reactions of Catalytic Reforming and Hydrogenolysis", *J. of Catalysis*, 78 352 (1982): P. Biloen et al. "The Role of Rhenium and Sulfur in Platinum-Based Hydrocarbon-Conversion Catalysts", J. of Catalysis, 63, 112 (1980): J. R. H. van Schaik et al, "Reactions of Alkanes on Supported Pt-Au Alloys", *J. Catalysis*, 38, 273–282 (1975); V. Ponec. "Selectivity in Catalysis by Alloys", *Cat. Rev. Sci. Eng.*, 11 41 (1975): and F. M. Dautzenberg et al, "Conversion of n-Hexane over Monofunctional Supported and Unsupported PtSn Catalysts", *J. of Catalysis*, 63. 119 (1980).

Although it is well known that sulfur compounds are capable of reducing the hydrogenolysis activity of noble metals supported on amorphous supports (see e.g., Menon et al supra), the response of zeolite supported noble metal catalysts to sulfur poisons is not at all predictable. For example, with respect to noble metal supported on amorphous (non-zeolite) supports, both geometric and chemical modifications of platinum have been proposed to explain the resulting change in reactivity upon contact with $H_2S$, $SO_2$ or organic sulfur compounds. However it is difficult to distinguish the two mechanisms experimentally. The geometric argument proposes that hydrogenolysis requires large ensembles of platinum atoms. Hence, if platinum is diluted with sulfur atoms the platinum particle size decreases and distance between platinum atoms increases, resulting in decreased hydrogenolysis activity, on the other hand, the chemical argument suggests that Pt—S has different (i.e. higher in some instances, lower in others) reactivity for hydrogenolysis compared to Pt alone because of its different structure.

Rabo et al, in "Sulfur-Resistant Isomerization Catalyst: Study of Atomic Platinum Dispersions On A Zeolite Support", *Third International Congress Catalysis*, North Holland, Amsterdam, 1965, Vol. 2. 1329, disclose that highly dispersed platinum within zeolite Y, which is a large pore size zeolite, demonstrated high resistance to sulfur poisons, whereas when zeolite Y was impregnated with platinum on the outside surface in anionic form, the catalyst composition rapidly lost activity in the presence of thiophene. Hence, Rabo et al clearly teach the unpredictable responses of noble-metal/zeolite catalysts to sulfur.

It has also been theorized that the platinum particle size and the presence of a metal modifier play a role in the sulfur sensitivity of noble metal/zeolite catalysts. See. e.g., P. Gallezot et al "Unusual Catalytic Behavior of Very Small Platinum Particles Engaged In Y Zeolites" *Proceedings of the Sixth International Congress On Catalysis*, Chemical Society, London. 2, 696 (1977): T. M. Tri et al "Sulfur Resistance of Modified Platinum Y Zeolite". *Studies In Surface Science and Catalysis*. 5, 279 (1980). However, both of these studies also point out the undesirability of organic sulfur compounds in the feed when using zeolite Y type catalysts. The prior art as a whole would suggest, if anything, that the sulfur sensitivity of zeolite catalysts is unpredictable, and in many instances that the presence of sulfur in the feed is not desirable.

Further, it is also known that other large pore size zeolite catalysts, such as zeolite L type catalysts e.g., Pt/Ba/zeolite L or Pt/K/zeolite L are very sensitive to sulfur and the feed must contain less than 0.05 ppm weight of $H_2S$. On the other hand. U.S. Pat. No. 4,579,831 teaches that binding Pt/Ba/L or Pt/K/L (e.g. employing a matrix type binder which forms a catalyst composite with the zeolite) will improve the sulfur resistance. This also demonstrates the unpredictable nature of zeolite catalysts to sulfur poisons.

SUMMARY OF THE INVENTION

Accordingly, one object of the present invention is to provide a process for the manufacture of aromatics.

A further object of the present invention is to provide a process for converting a $C_6$-$C_{12}$ paraffinic hydrocarbon feed to aromatics i.e., gasoline boiling range hydrocarbons.

Another object of the present invention is to provide a process for producing gasoline boiling range hydrocarbons which is capable of significantly improving gasoline octane.

A further object of the present invention is to provide an improved process for the manufacture of gasoline boiling range hydrocarbons from an economical standpoint by increasing gasoline octane.

To achieve the foregoing objects and in accordance with its purpose the present invention provides a process for converting a $C_6$-$C_{12}$ paraffinic hydrocarbon feed to aromatics by contacting the feed with a noble metal/low acidity medium pore size zeolite catalyst in a conversion zone by modifying the noble metal component of the catalyst to its sulfide form by presulfiding the catalyst or adding at least one of $H_2S$, $SO_2$ or an organic sulfur compound to the feed in an amount effective to suppress hydrogenolysis and increase aromatic selectivity of the catalyst.

Preferably, presulfiding comprises treating the noble metal/low acidity zeolite catalyst with 0.05 to 10 volume % $H_2S$ in $H_2$ at a temperature of from 350°-500° C. for a period of time sufficient to convert the noble metal to its sulfide form.

When at least one of $H_2S$, $SO_2$ or an organic sulfur compound is added to the feed to convert the noble metal to its sulfide form, the $H_2S$, $SO_2$ or organic sulfur compound is added in an amount of from about 15 to about 500 ppm (parts per million) sulfur by weight based on the total weight of the feed after addition of sulfur.

The paraffinic hydrocarbon feed preferably comprises $C_6$/$C_7$ paraffinic naphtha containing paraffins and naphthenes and olefins may be present in the feed in amounts up to about 15 wt %. It is also preferred that the conversion of the $C_6$-$C_{12}$ paraffinic hydrocarbon feed to aromatics takes place at a reaction temperature within the conversion zone of from about 650° to about 1300° F. and at a pressure below about 400 psig, and the weight per hourly space velocity (WHSV) of the feed is within the range of from about 0.1 to about 15. The conversion reaction preferably is carried out in the absence of a substantial amount of hydrogen added to the feed.

Preferably, the noble metal component of the zeolite catalyst comprises a platinum group metal selected from the group consisting of platinum palladium, iridium, osmium, rhodium and ruthenium and the platinum group metal is incorporated in the zeolite so as to comprise from about 0.01 to about 10 wt %, based on the total weight of the metal and zeolite.

Preferably, the catalyst has a low aluminum content or is exchanged with group IA or IIA cations and has an alpha value of less than or equal to about one (1). The zeolite catalyst preferably has a Constraint Index from 1 to 12, a silica to alumina ratio of at least about 12 and a crystal framework density of not substantially below about 1.6 g/cc. It is also preferred that the zeolite catalyst is selected from the group consisting of ZSM-5, ZSM-11, ZSM-12 ZSM-22, ZSM-23, ZSM-35 ZSM-38. ZSM-48 and Zeolite Beta.

A matrix binder can be present with the zeolite catalyst to form a catalyst composite which contains from 1% to 95% by weight of the zeolite catalyst.

BRIEF DESCRIPTION OF THE DRAWING

FIG. 1 represents experimental values of on-stream testing of this catalyst, as generally described hereinafter in the Example of the present invention.

DETAILED DESCRIPTION OF THE INVENTION

Figure 1:
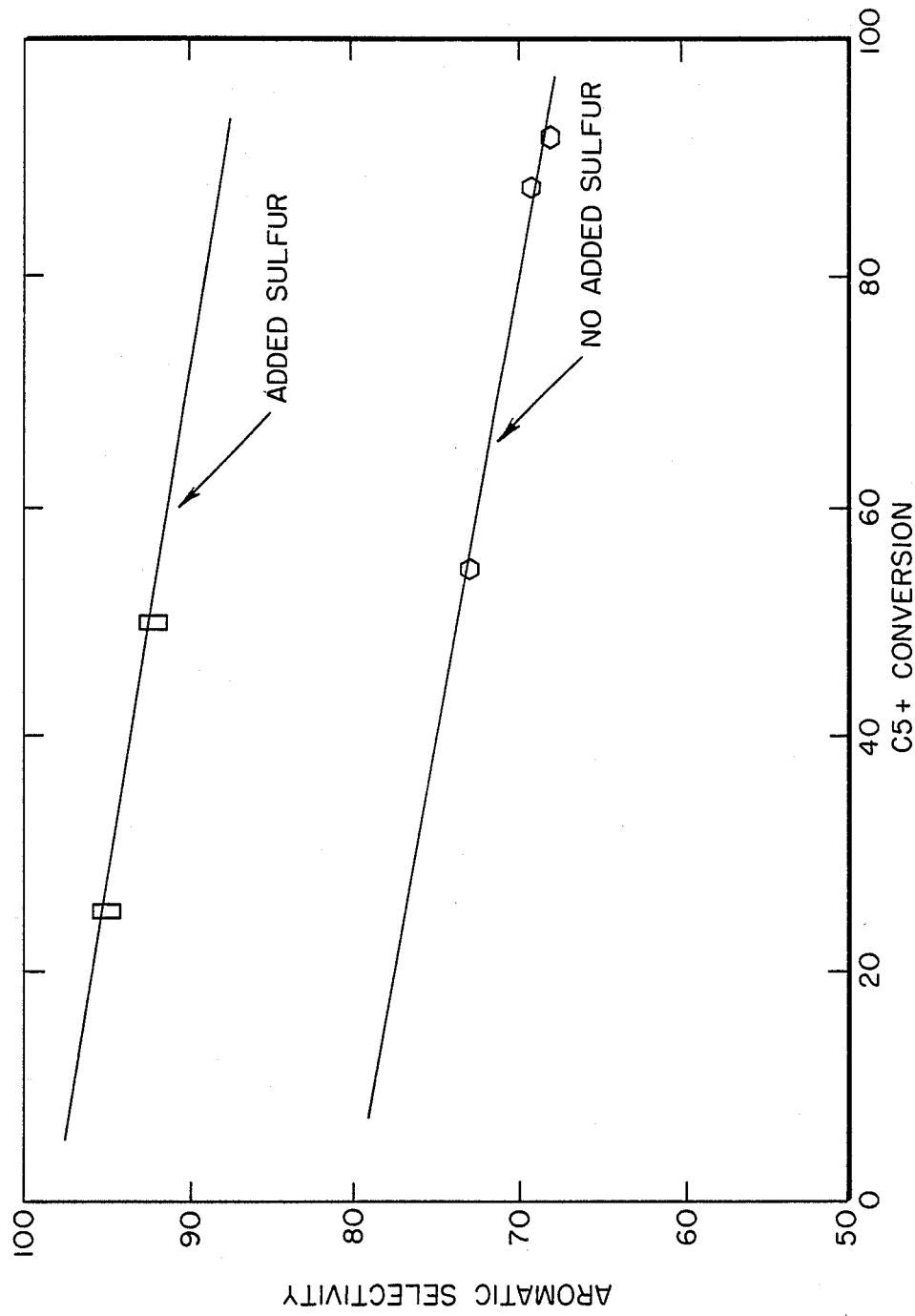
FIG. 1 represents a graph plotting aromatic selectivity versus $C_5+$ conversion for a Pt/high silica-low acidity ZSM-5 catalyst during conversion of the hydrocarbon feed with and without added sulfur.

It is contemplated that any nonaromatic $C_6$-$C_{12}$ paraffinic hydrocarbon may be used as feed to the conversion reactor in the process of this invention. A preferred feed comprises $C_6$/$C_7$ paraffinic naphtha containing paraffins and naphthenes, which may also contain relatively small amounts of aromatics. Olefins may be present in the feed in amounts up to about 15 wt. %, preferably less than 10 wt. %. The aromatics are substantially inert with respect to the zeolite catalysts used herein. The following table demonstrates feedstock properties of a preferred $C_6$/$C_7$ light paraffinic naphtha feed:

| $C_6$/$C_7$ Light Paraffinic Naphtha Feedstock Properties | |
|---|---|
| Boiling Range | 180–250° F. |
| Density at 60° F. | 0.6914 |
| Hydrogen, wt. % | 15.55 |
| Sulfur, ppmw | 0.02 |
| Nitrogen, ppmw | <0.02 |
| Paraffins, wt. % | 81.3 |
| Naphthenes, wt. % | 13.3 |
| Aromatics, wt. % | 5.4 |
| $C_5$, wt. % | 2.7 |
| $C_6$, wt. % | 49.8 |
| $C_7$, wt. % | 47.2 |
| $C_8$, wt. % | 0.3 |

The conversion zone utilized in the process of the present invention is preferably a fixed bed reactor but may be a fluidized or fluid transport type catalyst bed arrangement or a moving type catalyst bed, if desired. These types of conversion reactors are generally known in the art. A heat exchange type tubular reactor configuration may also be employed. Appropriate heat exchange apparatus may be provided both within and outside the catalyst bed, as desired or as required by the particular reactor system. Since the particular hydrocarbon conversion reaction in accordance with the present invention may be endothermic, exothermic or heat-balanced depending upon feed composition, provisions should be made for heat transfer within the system. This can be accomplished by indirect heat exchange with a suitable fluid. Heating, if needed, can be accomplished by direct firing as in a furnace. It can also be accomplished by direct heat exchange by means of the heated, regenerated catalyst and/or preheating of the feed, and/or heating or cooling a recycled stream. Aromatization reactions of saturated feeds are known to be highly endothermic and would therefore require significant heat input in some form or other. The overall conversion reaction in accordance with the present invention is generally endothermic.

The effects of the present invention are accomplished using a catalyst system containing a single catalyst reactor bed.

With respect to the conduct of the desired conversion reaction, the reaction temperature generally will be from about 650° to about 1300° F. The pressure may be from about atmospheric up to several hundred pounds pressure but is below about 400 psig. The weight per hourly space velocity (WHSV) of the feed is usually within the range of about 0.1 to about 15 WHSV. If a moving catalyst bed is used, then the space velocities employed are those which give contact times equivalent to those which are obtained at space velocities of 0.1 to 15 WHSV for a fixed bed. These relationships are well known in the art.

The temperature at which the process is carried out is important and depends to a large extent upon the particular composition of feed material which is being charged to the catalyst bed. It has been discovered that there are certain minimum critical temperatures which must be employed in order to obtain the desired reaction and that these minimum temperatures have nothing to do with the concept of percent of conversion of the feed material but rather are concerned with the selectivity of the conversion of the feed material to aromatics. Thus, it has been determined that for $C_{6}+$ paraffinic feeds as used in the present invention, the minimum temperature which should be employed is 650° F. The upper limit of temperature is not narrowly critical and any practical upper maximum can be used which does not present problems with respect to heat input nor drive the reaction so far that the thermal cracking overrides the catalytic reforming conversion. In this connection, it has been found that a practical upper limit of temperature is about 1300° F.

The aromatization in accordance with the present invention preferably should be carried out in the absence of substantial amounts of added hydrogen. For reasons which are not completely understood it appears that the addition of hydrogen in substantial amounts affects the ability of the medium pore size zeolite catalyst such as a ZSM-5 catalyst, to catalyze the aromatization reaction so that an overall diminution of the catalytic activity of these materials is experienced. Therefore, it is preferred in carrying out the process herein that no added hydrogen be employed. Further, it should be noted that hydrogen is a by-product of the aromatization reaction and therefore there is always some hydrogen present during the course of the reaction. The hydrogen which is formed during the reaction does not seem to be adverse to the aromatization reaction. The aforementioned diminution in activity is apparent only when substantial amounts of hydrogen are added. It may very well be that the desire to minimize coke formation on the catalyst will dictate addition of small quantities of hydrogen. While this is not preferred, it is accepted where necessary.

The noble metal/low acidity medium pore size zeolite catalysts employed in the conversion reactor in accordance with the process of the present invention will be described in detail hereinafter. In general, the catalyst comprises a noble metal on a low acidity intermediate pore size zeolite. The noble metal component preferably comprises a platinum group metal. Platinum palladium, iridium, osmium, rhodium or ruthenium are suitable noble metals for use in this invention. The low acidity zeolite (for example. ZSM-5). can be synthesized to have a low aluminum content, or may be exchanged with Group IA or IIA cations to reduce acidity. As is known in the art, and as used in this specification, the acidity of a catalyst may be measured by its "alpha value". In the present invention, the alpha value of the zeolite catalyst should be less than or equal to about one (1). preferably less than one. This is a relatively low alpha value, and this is the reason why the catalysts used in the process of this invention are termed "low acidity" zeolites. The lower limit for alpha value of the zeolite can be defined in functional terms. i.e.. alpha value can be as low as that which can be practically imparted to the zeolite and still achieve the objects of the present invention. It is difficult to define the exact lower limit of alpha value for low acidity zeolites useful in the present invention, because practical measurement becomes increasingly difficult at relatively low alpha values e.g.. 0.001. When alpha value is examined, it is noted that the alpha value is an approximate indication of the catalytic cracking activity of the catalyst compared to a standard catalyst and it gives the relative rate constant (rate of normal hexane conversion per volume of catalyst per unit time). It is based on the activity of a highly active silica-alumina zeolite cracking catalyst taken as an alpha of 1 (Rate Constant =0.016 sec$^{-1}$). In the case of zeolite HZSM-5. only 174 ppm of tetrahedrally coordinated $Al_2O_3$ are required to provide an alpha value of 1. The Alpha Test is described in U.S. Pat. No. 3,354,078. in *The Journal of Catalysis.* 6 pp. 522–529 (August 1965). and in *The Journal of Catalysis,* 61. p. 395 (1980). each incorporated herein by reference as to that description.

The platinum group metal can be incorporated in the zeolite by the well known techniques of ion exchange or impregnation so as to comprise from about 0.01 to about 10 wt. %, preferably 0.1 to 3.0 wt. %, based on the total weight of the metal and the zeolite.

The zeolites suitable for noble metal impregnation in the present invention will be described in detail hereinafter. These zeolites are members of a particular class of zeolites exhibiting some unusual properties, capable of inducing profound transformations of aliphatic hydrocarbons to aromatic hydrocarbons in commercially desirable yields and are generally highly effective in alkylation, isomerization, disproportionation and other reactions involving aromatic hydrocarbons. Although they have unusually low alumina contents. i.e.. high silica to alumina ratios, they are very active even with silica to alumina ratios exceeding 30. This activity is surprising since catalytic activity of zeolites is generally attributed to framework aluminum atoms and cations associated with these aluminum atoms. These zeolites retain their crystallinity for long periods in spite of the presence of steam even at high temperatures which induce irreversible collapse of the crystal framework of other zeolites. e.g.. of the X and A type. Furthermore, carbonaceous deposits, when formed on the zeolite, may be removed by burning at higher than usual temperatures to restore activity. In many environments, the zeolites of this class exhibit very low coke forming capability, conducive to very long times on stream between burning regenerations.

An important characteristic of the crystal structure of this class of zeolites is that it provides a selective constrained access to, and egress from, the intra-crystalline free space by virtue of having an effective pore size between the small pore Linde A and the large pore Linde X. i.e.. the pore windows of the structure are of about a size such as would be provided by 10-membered rings of silicon atoms interconnected by oxygen atoms. It is to be understood, of course, that these rings are those formed by the regular disposition of the tetrahedra making up the anionic framework of the crystalline aluminosilicate, the oxygen atoms themselves being bonded to the silicon (or aluminum, etc.) atoms at the centers of the tetrahedra. Briefly, the preferred zeolites useful as catalysts in this invention possess, in combination a "Constraint Index" (defined hereinafter) of from 1 to 12; a silica to alumina ratio of at least about 12; and a structure providing a selective constrained access to the crystalline free space.

The silica to alumina mole ratio referred to may be determined by conventional analysis. This ratio is meant to represent as closely as possible, the silica to alumina ratio in the rigid anionic framework of the zeolite crystal and to exclude aluminum which is present in the binder or which is present in cationic or other form within the channels. Although zeolites with silica to alumina mole ratios of at least 12 are useful, it is preferred to use zeolites having higher ratios of at least about 30. In some instances, zeolites having substantially higher silica/alumina ratios, e.g., 1600 and above, may be used.

Such zeolites after activation acquire an intracrystalline sorption capacity for normal hexane which is greater than that for water, i.e., they exhibit "hydrophobic" properties. It is believed that this hydrophobic character is advantageous in the present invention.

The members of the class of zeolites useful herein have an effective pore size of generally from about 5 to about 8 Angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA (tetramethyl ammonium) offretite does show some constrained access. Other 12-ring structures may exist which may be operative for other reasons, and therefore, it is not the intention of the present invention to entirely judge the usefulness of the particular zeolite solely from theoretical structure considerations.

A convenient measure of the extent to which a zeolite provides controlled access to molecules of varying sizes to its internal structure is the Constraint Index of the zeolite. Zeolites which provide a highly restricted access to and egress from its internal structure have a high value for the Constraint Index, and zeolites of this kind usually have pores of small size. e.g. less than 5 Angstroms. On the other hand, zeolites which provide relatively free access to the internal zeolite structure have a low value for the Constraint Index, and usually pores of large size. e.g. greater than 8 Angstroms. The method by which Constraint Index is determined is described fully in U.S. Pat. No. 4,016,218. incorporated herein by reference for details of the method.

Constraint Index (CI) values for some typical materials, including some which are not within the purview of this invention, are:

|  | CI (at test temperature) |
| --- | --- |
| ZSM-4 | 0.5 (316° C.) |
| ZSM-5 | 6–8.3 (371° C.–316° C.) |
| ZSM-11 | 5–8.7 (371° C.–316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |
| Zeolite Beta | 0.6–2.0 (316° C.–399° C.) |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operations (conversion) and the presence or absence of binders. Likewise, other variables, such as crystal size of the zeolite the presence of occluded contaminants, etc., may affect the Constraint Index. Therefore it will be appreciated that it may be possible to so select test conditions, e.g. temperature as to establish more than one value for the Constraint Index of a particular zeolite. This explains the range of Constraint Indices for some zeolites, such as ZSM-5 ZSM-11 and Beta.

It is to be realized that the above CI values typically characterize the zeolites shown in the table above (including some outside the scope of the present invention), but that such are the cumulative result of several variables useful in the determination and calculation thereof. Thus, for a given zeolite exhibiting a CI value within the range of 1 to 12depending on the temperature employed during the test method within the range of 290° C. to about 538° C. with accompanying conversion between 10% and 60%, the CI may vary within the indicated range of 1 to 12. Likewise, other variables such as the crystal size of the zeolite, the presence of possibly occluded contaminants and binders intimately combined with the zeolite may affect the CI. It will accordingly be understood to those of ordinary skill in the art that the CI. as utilized herein, while affording a highly useful means for characterizing the zeolites of interest is approximate, taking into consideration the manner of its determination, with the possibility in some instances of compounding variable extremes. However, in all instances at a temperature within the above-specified range of 290° C. to about 538° C., the CI will have a value for any given zeolite of interest for use in the present invention within the approximate range of 1 to 12.

The class of zeolites which are useful in the present invention is exemplified by ZSM-5. ZSM-11. ZSM-12. ZSM-22. ZSM-23 ZSM-35 ZSM-38 ZSM-48. Zeolite Beta and other similar materials.

ZSM-5 is more particularly described in U.S. Pat. No. 3,702,886 and U.S. Patent Re. 29,948, the entire contents of which are incorporated herein by reference.

ZSM-11 is more particularly described in U.S. Pat. No. 3,709,979 the entire contents of which are incorporated herein by reference.

ZSM-12 is more particularly described in U.S. Pat. No. 3,832,449, the entire contents of which are incorporated herein by reference.

ZSM-22 is more particularly described in U.S. Pat. Nos. 4,481,177, 4,556,477 and European Pat. No. 102,716, the entire contents of each being expressly incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4.046,859, the entire contents of which are incorporated herein by reference.

Zeolite Beta is taught in U.S. Pat. No. 3,308,069 and is taught as a catalyst component for isomerization dewaxing in U.S. Pat. 4,419,220 and 4,501,926. These disclosures are also incorporated herein by reference.

ZSM-48 is more particularly described in U.S. Pat. No. 4,397,827 the entire contents of which are incorporated herein by reference. The following description illustrates characteristics of zeolites useful in the present invention, using ZSM-48 as an example. This zeolite can be identified, in terms of moles of anhydrous oxides per 100 moles of silica, as follows:

$$(0-15)RN:(0-1.5)M_{2/n}O: (0.2)Al_2O_3:(100)SiO_2$$

wherein:
M is at least one cation having a valence n; and
RN is a $C_1-C_{20}$ organic compound having at least one amine  functional group of $pK_a \not< 7$.

It is recognized that, particularly when the zeolite ZSM-48 composition contains tetrahedral framework aluminum a fraction of the amine functional groups may be protonated. The doubly protonated form, in conventional notation, would be $(RNH)_2O$ and is equivalent in stoichiometry to $2 RN+H_2O$.

The characteristic X-ray diffraction pattern of the synthetic zeolite ZSM-48 has the following significant lines:

| Characteristic Lines of ZSM-48 | |
| --- | --- |
| d (Angstroms) | Relative Intensity |
| 11.9 | W-S |
| 10.2 | W |
| 7.2 | W |
| 5.9 | W |
| 4.2 | VS |
| 3.9 | VS |
| 3.6 | W |
| 2.85 | W |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d (obs.), the interplanar spacing in angstroms, corresponding to the recorded lines, were calculated. In the foregoing table the relative intensities are given in terms of the symbols W=weak VS=very strong and W-S=weak-to-strong. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

The ZSM-48 can be prepared from a reaction mixture containing a source of silica, water, RN, an alkali metal oxide (e.g. sodium) and optionally alumina. The reaction mixture should have a composition, in terms of mole ratios of oxides, falling within the following ranges:

| REACTANTS | BROAD | PREFERRED |
| --- | --- | --- |
| $Al_2O_3/SiO_2 =$ | 0 to 0.02 | 0 to 0.01 |
| $Na/SiO_2 =$ | 0 to 2 | 0.1 to 1.0 |
| $RN/SiO_2 =$ | 0.01 to 2.0 | 0.05 to 1.0 |
| $OH-/SiO_2 =$ | 0 to 0.25 | 0 to 0.1 |
| $H_2O/SiO_2 =$ | 10 to 100 | 20 to 70 |
| $H+$ (added) $SiO_2 =$ | 0 to 0.2 | 0 to 0.05 | wherein RN is a $C_1-C_{20}$ organic compound having at least one amine functional group of $pK_a \geq 7$. The mixture is maintained at 80°-250° C. until crystals of the material are formed. H+ (added) is moles acid added in excess of the moles of hydroxide added. In calculating H+ (added) and OH values, the term acid (H+) includes both hydronium ion, whether free or coordinated, and aluminum. Thus aluminum sulfate for example, would be considered a mixture of aluminum oxide, sulfuric acid, and water. An amine hydrochloride would be a mixture of amine and HCl. In preparing the highly siliceous form of ZSM-48 no alumina is added. Thus, the only aluminum present occurs as an impurity in the reactants.

Preferably, crystallization is carried out under pressure in an autoclave or static bomb reactor, at 80° C. to 250° C. Thereafter, the crystals are separated from the liquid and recovered. The zeolite composition can be prepared utilizing materials which supply the appropriate oxide. Such materials include sodium silicate, silica hydrosol, silica gel, silicic acid. RN. sodium hydroxide, sodium chloride, aluminum sulfate, sodium aluminate, aluminum oxide, or aluminum itself. RN is a $C_1-C_{20}$ organic compound containing at least one amine functional group of $pk_a \geq 7$, as defined above, and includes such compounds as $C_3$-$C_{18}$ primary, secondary, and tertiary amines, cyclic amines (such as piperidine, pyrrolidine and piperazine), and polyamines such as $NH_2$—$C_nH_{2n}$—$NH_2$ wherein n is 4-12.

Turning from the above detailed description of ZSM-48 to the general class of zeolites useful in the present invention, the original cations which may be in/on the zeolite crystal framework can be subsequently replaced, at least in part by calcination and/or ion exchange with another cation. Thus, the original cations are exchanged into a hydrogen or hydrogen ion precursor form or a form in which the original cation has been replaced by a metal of Groups II through VIII of the Periodic Table. Thus, for example, it is contemplated to exchange the original cations with ammonium ions or with hydronium ions. Catalytically active forms of these would include, in particular, hydrogen, rare earth metals, aluminum manganese and other metals of Groups II and VIII of the Periodic Table.

It is to be understood that by incorporating by reference the foregoing patents to describe examples of specific members of the zeolite class useful in the present invention with greater particularity, it is intended that identification of the therein disclosed crystalline zeolites be resolved on the basis of their respective X-ray diffraction patterns. As discussed above, the present invention contemplates utilization of such catalysts wherein the mole ratio of silica to alumina is essentially unbounded. The incorporation by reference of the above-identified patents should therefore not be construed as limiting the disclosed crystalline zeolites to those having the specific silica-alumina mole ratios discussed therein, since it is now known that such zeolites may be substantially aluminum-free and yet, having the same crystal structure as the disclosed materials, may be useful or even preferred in some applications. It is the crystal structure, as identified by the X-ray diffraction "fingerprint", which establishes the identity of the specific crystalline zeolite material.

The zeolites described above for use in the present invention, when prepared in the presence of organic cations are substantially catalytically inactive, possibly because the intracrystalline free space is occupied by organic cations from the forming solution. They may be activated by heating in an inert atmosphere at 1000° F. for one hour, for example, followed by base exchange with ammonium salts followed by calcination at 1000° F. in air. The presence of organic cations in the forming solution may not be absolutely essential to the formation of this special type of zeolite. However, the presence of these cations does appear to favor the formation of this type of zeolite which is useful in the present invention. More generally, it is desirable to activate this type of zeolite by base exchange with ammonium salts followed by calcination in air at about 1000° F. for from about 15 minutes to about 24 hours.

Natural zeolites may sometimes be converted to this type zeolite by various activation procedures and other treatments such as base exchange, steaming, alumina extraction and calcination, alone or in combinations. Natural minerals which may be so treated include ferrierite, brewsterite, stilbite, dachiardite, epistilbite heulandite and clinoptilolite. The preferred crystalline aluminosilicates are ZSM-5, ZSM-11, ZSM-12, ZSM-22, ZSM-23, ZSM-35 and ZSM-48, with ZSM-5 particularly preferred.

The zeolites used as catalysts in this invention may be in the hydrogen form or they may be base exchanged or impregnated to contain ammonium or a metal cation complement. The metal cations that may be present include any of the cations of the metals of Group I through VIII of the periodic table. However, in the case of Group IA metals, the cation content should in no case be so large as to substantially eliminate the activity of the zeolite for the catalysts being employed in the instant invention.

In a preferred aspect of this invention the zeolites useful as catalysts herein are selected from those having a crystal framework density, in the dry hydrogen form, of not substantially below about 1.6 grams per cubic centimeter. It has been found that zeolites which satisfy all three of the above-discussed criteria (i.e.. a Constraint Index of 1 to 12, a silica to alumina ratio of at least about 12. and a crystal framework density of not substantially below about 1.6 g/cc) are most desired for use in the present invention. When hydrocarbon products or by-products are catalytically formed, for example, such zeolites tend to maximize the production of gasoline boiling range hydrocarbon products. Therefore, the preferred catalysts of this invention are those comprising zeolites having a Constraint Index as defined above of about 1 to 12. a silica to alumina ratio of at least about 12 and a dried crystal density of not substantially less than about 1.6 grams per cubic centimeter. The dry density for known structures may be calculated from the number of silicon plus aluminum atoms per 1000 cubic Angstroms, as given e.g., on page 19 of the article "Zeolite Structure" by W. M. Meier. This paper, the entire contents of which are incorporated herein by reference, is included in "Proceedings of the Conference on Molecular Sieves." (London. April, 1967) published by the Society of Chemical Industry. London. 1968.

When the crystal structure is unknown, the crystal framework density may be determined by classical pyknometer techniques. For example, it may be determined by immersing the dry hydrogen form of the zeolite in an organic solvent which is not sorbed by the crystal. Or, the crystal density may be determined by mercury porosimetry, since mercury will fill the interstices between crystals but will not penetrate the intracrystalline free space.

It is possible that the unusual sustained activity and stability of this class of zeolites is associated with its high crystal anionic framework density of not less than about 1.6 grams per cubic centimeter. This high density must necessarily be associated with a relatively small amount of free space within the crystal, which might be expected to result in more stable structures. This free space, however, seems to be important as the locus of catalytic activity.

Crystal framework densities of some typical zeolites, including some which are not within the purview of this invention, are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |
| Dachiardite | .32 | 1.72 |
| L | .32 | 1.61 |

-continued

| Zeolite | Void Volume | Framework Density |
| --- | --- | --- |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

It is to be understood that the practice of the present invention is also applicable to isomorphs of the above-described crystalline aluminosilicate catalysts. For example, the aluminum may be replaced by elements such as gallium, and silicon by elements such as germanium.

A matrix binder can be employed with the noble metal/low acidity zeolite conversion catalyst. The matrix material should be resistant to the temperature and other conditions employed in the process of the present invention. The matrix binder imparts greater resistance to the catalyst for the severe temperature, pressure and reactant feed stream velocity conditions encountered in the process of the present invention. The catalyst can be incorporated, combined, dispersed or otherwise intimately admixed with the matrix binder in such proportions that the resulting composite will contain from 1% to 95% by weight and preferably from 10% to 70% by weight, of the noble metal/low acidity zeolite in the final catalyst composite. A most preferred ratio is 65% by weight zeolite catalyst to 35% by weight matrix binder.

The term "matrix" includes inorganic compositions with which the zeolites can be incorporated, combined dispersed, or otherwise intimately admixed with the catalyst wherein the matrix itself may be catalytically active or inactive, porous or non-porous. It is to be understood that the porosity of the composition employed as a matrix can be either inherent in the particular material or it can be introduced by mechanical or chemical means. Representative of matrices which can be employed include metals and alloys thereof, sintered metals, and sintered glass, asbestos, silicon carbide aggregates, pumice, firebrick diatomaceous earths, alumina and inorganic oxides. Inorganic compositions, especially those comprising alumina and those of a siliceous nature, are preferred. Of these matrices, inorganic oxides such as clay, chemically-treated clays, silica, silica alumina, etc., as well as alumina, are particularly preferred because of their superior porosity, attrition resistance and stability. Techniques for incorporating a zeolite catalyst into a matrix are known in the art and set forth in U.S. Pat. No. 3,140,253.

The improvement of the present invention can be characterized generally as a modification of the noble metal/low acidity medium pore size zeolite catalyst to suppress hydrogenolysis and to obtain improved aromatic selectivity. This modification can be achieved in two ways i.e., by "presulfiding" the catalyst or by adding a sulfur-containing compound to the hydrocarbon feed. In either case, the noble metal is converted to the sulfide form. Presulfiding can be performed by treating the noble metal/low acidity zeolite catalyst with, e.g.. 0.05 to 10 vol. % $H_2S$ in $H_2$ at high temperatures. e.g.. 350°–500° C. for a sufficient amount of time to convert the noble metal to the sulfide form. At 500° C. and 2 vol. % $H_2S$ in $H_2$. the presulfiding treatment should be carried out for about 2 hours to ensure complete reaction. This can be confirmed by testing the gaseous effluent with lead acetate paper.

The noble metal/low acidity zeolite catalyst can also be converted to the sulfide form by adding $H_2S$, $SO_2$ or an organic sulfur compound such as dibenzothiophene, to the feed. Other suitable organic sulfur compounds include carbon disulfide, thiophene, dimethylsulfide, etc. The sulfur compound should be added to the feed in amounts effective to convert the noble metal to its sulfide form i.e. from about 15 to about 500 ppm S (by wt.), preferably from 50 to 250 ppm S. based on the total weight of the feed after sulfur addition.

When the noble metal is converted to the sulfide form in accordance with the present invention, hydrogenolysis of the feed material, which is a major undesirable side reaction and leads to lower aromatic selectivity, is suppressed and the aromatic selectivity is concomitantly increased. That is, in the present invention, the improved aromatic selectivity results when the undesirable hydrogenolysis side reaction, methane formation is passivated due to the exposure of the zeolite catalyst to $H_2S$, $SO_2$ or organic sulfur compounds. Thus, the aromatic selectivity of the catalyst employed in the conversion zone is significantly improved by presulfiding the catalyst or by adding a sulfur-containing compound to the feed, as illustrated in the Examples of the present invention hereafter.

The reaction mixture recovered from the reactor bed will contain both aliphatic and aromatic gasoline boiling range hydrocarbons, lighter aliphatic hydrocarbons and water. Product recovery may be by a series of unit operations employing a relatively simple condensation and decantation to separate a gaseous phase, a liquid hydrocarbon phase and an aqueous phase from each other. More specifically, the gaseous, liquid hydrocarbon and water phases may be separated by a conventional product separator, and the resulting gaseous and liquid hydrocarbon streams are sent to conventional petroleum fractionators for separation and stabilization, and the waste water phase is usually sent to a waste water treatment plant.

The present invention will now be described in the following example with reference to specific embodiments thereof which are not to be construed, however, as limiting the scope of the present invention in any manner whatsoever. For example Pt/ZSM-5 will be used as the noble metal impregnated zeolite catalyst illustrating the process of the present invention, but it will understood that other noble metal/low acidity zeolite catalysts as defined above within the scope of the present invention could be used interchangeably with Pt/ZSM-5 and achieve similar results.

EXAMPLE

ZSM-5 having a silica to alumina ratio of 26,000:1, and an alpha value of about 1 was heated in $N_2$ at 2° C./min. to 538° C. for 2 hours, then held in air at 538° C. for 2 hours. The thus-calcined zeolite was treated with Pt($NH_{34}$)($NO_3$)$_2$ in D.I. (deionized) water at pH=9 for 2 hours at room temperature. The resulting Pt/ZSM-5 was further air calcined by heating at 2° C./min. to 350° C. and held for 2 hours. The resulting catalyst contained 0.7 wt. % platinum.

The dehydrocyclization selectivity of the Pt/ZSM-5 was tested with a $C_6/C_7$ naphtha feed comprising 81.3 wt. % paraffins. 13.3 wt. % naphthenes and 5.4 wt. % aromatics. The hydrocarbon distribution of the feed was 2.7 wt. % $C_5$, 49.8 wt. % $C_6$, 47.2 wt. % $C_7$ and 0.3 wt. % $C_8$.

One cc of the catalyst prepared above was placed in a 3/8" stainless steel reactor packed between vycor beds. The catalyst was reduced in hydrogen at 350° C. for 1 hour and then contacted with the feed. Reaction conditions were 538° C., atmospheric analyzed pressure, 2.5 liquid hourly space velocity (LHSV) and 0 to 10 $H_2$/hydrocarbon (molar ratio). The reaction products were analyzed by on-line gas chromatography analysis, as well as by off-line gas and liquid product collection. The combined gas and liquid recovery was 99%.

The product yields obtained for the Pt/ZSM-5 used to process the $C_6/C_7$ naphtha feed described above without added $H_2$ are shown in e.g., Run 1 in Table 1 below. At 86% $C_5+$ conversion. 28 wt. % $C_1+C_2$ (90% as $C_1$) and 58 wt. % aromatics are produced. The aromatic selectivity was calculated as 67%. Aromatic selectivity is defined as (wt. % aromatics produced)/(wt % $C_5+$ conversion) x 100. Further when 10 cc/min $H_2$ were added to the feed in Run 2. the $C_1+C_2$ yield increased to 36 wt. % and the aromatic selectivity decreased to 61% at 93 wt. % $C_5+$ conversion. These results demonstrate that hydrogenolysis is a major side reaction of the process and leads to low aromatic yields.

Run 3 shown below in Table 1 is also a comparative run without added sulfur, but employed an aged catalyst and exhibited a lower $C_5+$ conversion of 55 wt % due to catalyst aging. Aromatic selectivity was 78%.

To illustrate the effects of the present invention by modifying the Pt function of the catalyst and reducing the hydrogenolysis activity of Pt/high silica ZSM-5, 70 ppm sulfur as dibenzothiophene were added to the $C_6/C_7$ naphtha feed. Table 1 below shows the results for three runs which were performed in accordance with the present invention using the same catalyst but measuring the product distribution from continuous on-stream operation at different times. Thus, in Run 4 the catalyst was freshest, and the product distribution in Runs 5 and 6 was measured based on correspondingly aged catalysts. This accounts for the decrease in $C_5+$ conversion in Runs 4. 5 and 6 (and also in Runs 1. 2 and 3). As shown in Run 4. the aromatic selectivity increased to 92% (in comparison with comparative Runs 1-3) with only 8 wt. % $C_1+C_2$ selectivity. Run 4 is shown on the graph in FIG. 1. The product distribution is shown in Table 1. In Run 5, the catalyst showed some loss in activity. i.e.. $C_5+$ conversion was 49.4%. but aromatic selectivity remained desirably high at 90%. In general. $C_5+$ conversion can be expected to be about 25-50 wt. % in accordance with the process of the present invention. For example Run 6 shows a $C_5+$ conversion of 26.8 wt % and aromatic selectivity of 94%, and is also depicted in FIG. 1 which shows a plot of aromatic selectivity versus $C_5+$ conversion for Pt/high silica ZSM-5 with and without added sulfur in accordance with this Example.

TABLE 1

Product Distributions From Pt/low acidity ZSM-5 With And Without Dibenzothiophene

| Wt. % | Run: 1 wo/S | 2 wo/S* | 3 wo/S | 4 w/S | 5 w/S | 6 w/S |
|---|---|---|---|---|---|---|
| $C_1 + C_2$ | 28.0 | 36.0 | 9.2 | 8.0 | 3.4 | 1.0 |
| Benzene | 39.1 | 52.1 | 25.7 | 30.0 | 28.6 | 13.6 |
| Toluene | 19.4 | 5.1 | 17.3 | 20.2 | 15.8 | 12.0 |
| Xylenes | 0.3 | 0.0 | 0.0 | 2.7 | 0.0 | 0.2 |
| % $C_5+$ Conversion | 86 | 93 | 55 | 60 | 49.4 | 26.8 |
| Aromatic Selectivity | 67% | 61% | 78% | 92% | 90% | 94% |

*10 cc/min $H_2$ were added to the feed.

The above data illustrate the improved aromatic selectively able to be obtained in accordance with the present invention employing a noble metal/low acidity zeolite catalyst, such as Pt/ZSM-5, by adding sulfur to the paraffinic feedstock. It will be understood that the effects of the present invention can also be attained by presulfiding the noble metal/low acidity zeolite catalyst as described above to convert the noble metal to its sulfide form.

Having thus generally described the process of the present invention and discussed specific embodiments in support thereof it is to be understood that no undo restrictions as to the scope of the present invention are to be imposed by reason thereof.

What is claimed is:

1. In a process for converting a $C_6$-$C_{12}$ paraffinic hydrocarbon feed to aromatics by contacting said feed with a noble metal/low acidity medium pore size zeolite catalyst in a conversion zone, the improvement which comprises.

modifying the noble metal component of the catalyst to its sulfide form by presulfiding the catalyst or adding at least one of $H_2S$. $SO_2$ or an an organic sulfur compound to the feed in an amount effective to suppress hydrogenolysis and increase aromatic selectivity of the catalyst.

2. The process according to claim 1, wherein the noble metal component is modified by presulfiding which comprises treating the noble metal/low acidity zeolite catalyst with 0.05 to 10 volume % $H_2S$ in $H_2$ at a temperature of from 350° to 500° C. for a period of time sufficient to convert the noble metal to its sulfide form.

3. The process according to claim 1, wherein the noble metal component is modified by adding at least one of $H_2S$, $SO_2$ or an organic sulfur compound to the feed in an amount of from about 15 to about 500 ppm S by weight based on the total weight of the feed after sulfur addition.

4. The process according to claim 3, wherein said amount is from 50 to 250 ppm S by weight.

5. The process according to claim 3 wherein said organic sulfur compound is selected from the group consisting of dibenzothiophene, carbon disulfide, thiophene and dimethylsulfide.

6. The process according to claim 1, wherein said paraffinic hydrocarbon feed comprises $C_6/C_7$ paraffinic naphtha containing paraffins and naphthenes and wherein olefins may be present in the feed in an amount up to about 15 wt. %.

7. The process according to claim 6, wherein said olefins are present in the feed in an amount of less than 10 wt. %.

8. The process according to claim 1, wherein said conversion zone comprises a reactor selected from among a fixed bed reactor a fluidized or fluid transport type catalyst bed arrangement, a moving type catalyst bed or a heat exchange type tubular reactor configuration.

9. The process according to claim 8, wherein said reactor is a fixed bed reactor.

10. The process according to claim 1, wherein said converting takes place within said conversion zone at a temperature of from about 650° to about 1300° F. and at a pressure below about 400 psig and the WHSV of the feed is from about 0.1 to about 15.

11. The process according to claim 1, wherein the conversion reaction is carried out in the absences of a substantial amount of hydrogen added to the feed.

12. The process according to claim 1 wherein the noble metal component of the zeolite catalyst is a platinum group metal selected from the group consisting of platinum, palladium iridium, osmium, rhodium and ruthenium, and said platinum group metal is incorporated in the zeolite so as to comprise from about 0.01 to about 10 wt. % based on the total weight of the metal and zeolite.

13. The process according to claim 12, wherein the platinum group metal is incorporated in the zeolite so as to comprise from 0.1 to 3.0 wt. % based on the total weight of the metal and zeolite.

14. The process according to claim 1, wherein the noble metal/low acidity zeolite catalyst has a low aluminum content or is exchanged with group IA or IIA cations.

15. The process according to claim 14, wherein said noble metal/low acidity zeolite has an alpha value of less than or equal to about one (1).

16. The process according to claim 1, wherein said noble metal/low acidity medium pore size zeolite catalyst has a Constraint Index of from 1 to 12. a silica to alumina ratio of at least about 12 and a crystal framework density of not substantially below about 1.6 g/cc.

17. The process according to claim 16, wherein said zeolite catalyst is selected from the group consisting of ZSM-5 ZSM-11. ZSM-12 ZSM-22. ZSM-23. ZSM-35 ZSM-3%, ZSM-48 and Zeolite Beta.

18. The process according to claim 1 wherein said noble metal/low acidity medium pore size zeolite catalyst is Pt/ZSM-5 containing 0.7 wt. % platinum, the ZSM-5 [having a silica to alumina ratio of 26,0001 and an alpha value of about one (1).

19. The process according to claim 1, wherein a matrix binder is present with the zeolite catalyst to form a catalyst composite, in such proportions that the[catalyst composite contains from 1% to 95% by weight of the noble metal/low acidity zeolite.

20. The process according to claim 19, wherein the catalyst composite contains from 10% to 70% by weight of the noble metal/low acidity zeolite.

21. A process according to claim 20, wherein the catalyst composite contains 65% by weight catalyst to 35% by weight binder.

* * * * *